United States Patent [19]

Presley

[11] 4,383,412

[45] May 17, 1983

[54] MULTIPLE PUMP LOAD SENSING SYSTEM

[75] Inventor: Glen T. Presley, Angola, Ind.

[73] Assignee: Cross Manufacturing, Inc., Lewis, Kans.

[21] Appl. No.: 85,884

[22] Filed: Oct. 17, 1979

[51] Int. Cl.³ ............................................. F15B 13/09
[52] U.S. Cl. ....................................... 60/430; 60/452; 60/486
[58] Field of Search ................. 60/428, 429, 430, 486, 60/443, 450, 452, 421; 417/216; 137/596.12, 596.13; 91/29

[56] References Cited

U.S. PATENT DOCUMENTS

| | | | |
|---|---|---|---|
| 3,386,344 | 6/1968 | Junck et al. | 91/532 |
| 3,486,334 | 12/1969 | Miller | 60/450 |
| 3,815,477 | 6/1974 | Ailshif et al. | 137/596.13 X |
| 3,972,187 | 8/1976 | Ital et al. | 60/428 |
| 3,985,472 | 10/1976 | Virtue et al. | 417/216 |
| 4,037,410 | 7/1977 | Jackson et al. | 60/452 X |
| 4,141,280 | 2/1979 | Lorimor | 91/29 |
| 4,231,396 | 11/1980 | Budzich | 137/596.13 |

Primary Examiner—Gerald A. Michalsky
Attorney, Agent, or Firm—Edward L. Brown, Jr.

[57] ABSTRACT

A load responsive system employing a fixed displacement pump and a variable displacement pump in a parallel circuit as a source of fluid in an open-center load sensing system. The load response control valve includes an unloading spool which is flow responsive in the operative positions of the control valve and maintains a constant $\Delta p$ across the control valve by dumping the pump flow to reservoir; the control valve $\Delta p$ being greater than the $\Delta p$ of the pump compensator means so that the variable displacement pump will remain destroked until the system utilizes the full flow of the fixed displacement pump at which time the variable displacement pump strokes-out upon demand.

7 Claims, 4 Drawing Figures

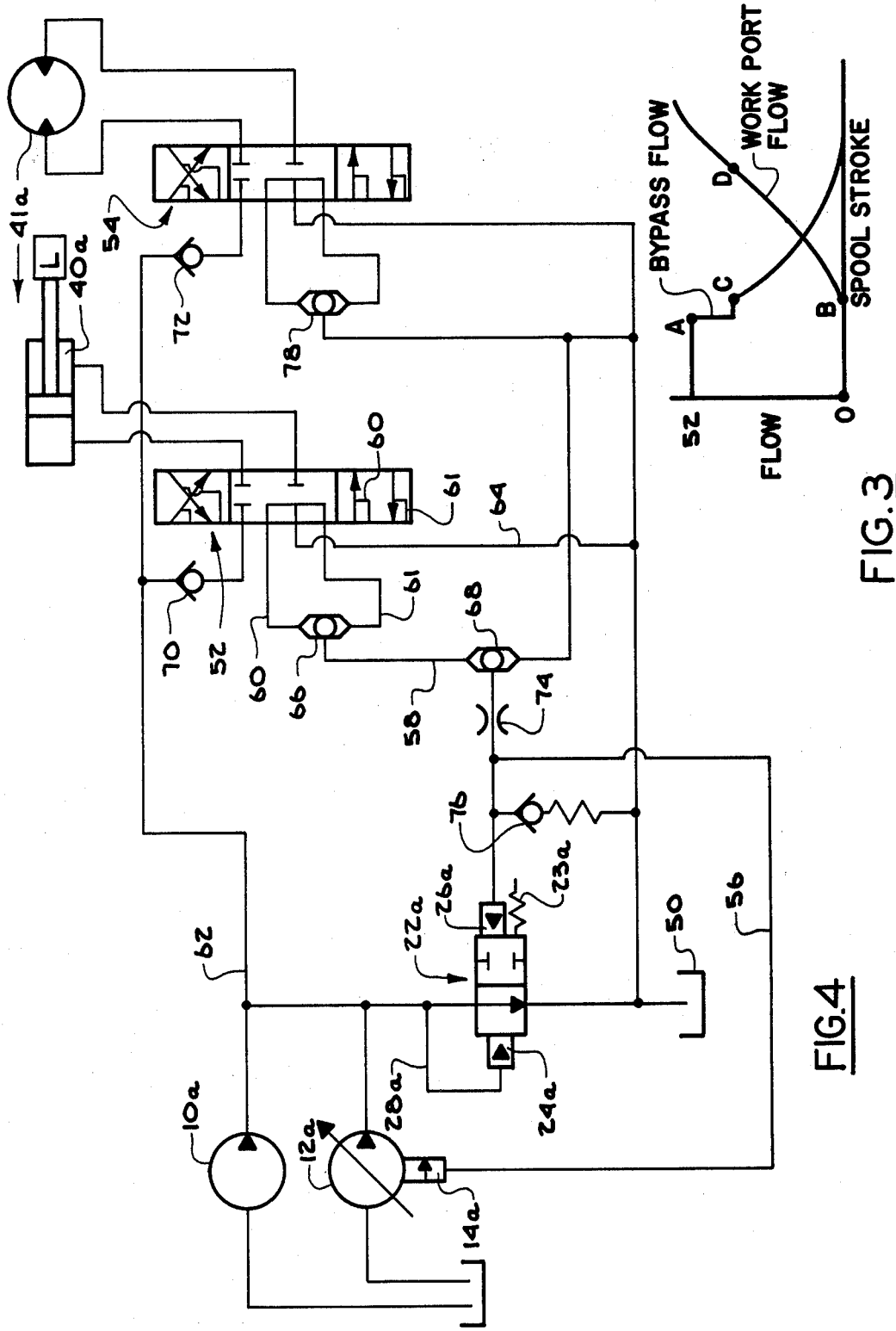

MULTIPLE PUMP LOAD SENSING SYSTEM

BACKGROUND OF THE INVENTION

In the current state of the art, variable volume load sensing hydraulic systems are being used on farm and construction equipment as well as various other mobile hydraulic applications. These applications have varying hydraulic demands including the basic power requirements for moving the vehicle. Variable volume load sensing systems are highly efficient and provide substantial horsepower savings over the fixed displacement systems. All systems of this type which operate near the full power capacity of the machine, require some means of horsepower limiting so as not to exceed the capacity of the prime mover and stall the engine.

One alternative to a variable volume system is to use two fixed displacement pumps in parallel with an unloading valve on one pump which dumps the flow to drain from that pump when a pressure level is exceeded. This increases the corner horsepower of the system. One disadvantage of this system is the abrupt flow change when the one pump is unloaded. Another undesirable feature is that the maximum horsepower can only be achieved at two points rather than the infinite choice available with a variable volume system.

The principle disadvantage of variable volume systems is the high cost of the variable volume pump which becomes an even greater factor in the large displacement systems. While there are numerous small variable volume pumps on the market below 3.5 CIR; there are very few larger displacement pumps available and the costs are accordingly very high.

DESCRIPTION OF THE PRESENT INVENTION

The system of the present invention is also a dual pump system; however, it has the advantages of true horsepower limiting available with variable volume pumps as well as the low cost realized with fixed displacement pumps. The present invention employs a large volume fixed displacement pump connected in parallel with a relatively small variable displacement pump with appropriate horsepower limiting controls and a load sensing type control valve of the type covered in U.S. Pat. 3,815,477. The two pump outlets are connected to the control valve inlet which contains an unloading spool which dumps the output of both pumps to reservoir in the neutral position of the valve. As the control valve spool is moved towards a power position, work load pressure is communicated to both the variable pump compensator and the downstream side of the unloading spool which causes the variable displacement pump to stroke back to zero flow since the $\Delta p$ across the main control valve is greater than the $\Delta p$ on the variable displacement pump. As the control valve spool is further opened, flow to the motor is increased while the bypass flow at the unloading valve is decreased until the motor takes all of the flow from the fixed displacement pump, at which time the $\Delta p$ across the control valve spool begins to drop. As the control valve $\Delta p$ drops to the level of the pump compensator, the variable displacement pump begins to stroke-out increasing its flow as required in combination with the fixed displacement pump flow. The variable displacement pump flow will continue to increase with further spool movement until the variable displacement pump is at full stroke. Since the variable displacement pump is supplying the top or high pressure end of the flow; pump horsepower limiters can be employed on the variable pump so that a constant horsepower can be maintained at varying pressure and flow settings.

It is therefore the principle object of the present invention to provide a multiple pump system having the characteristics of a large variable displacement system.

Another object of the present invention is to provide an inexpensive multiple pump system having horsepower limiters across a varying range of pressures and flows.

Another object of the present invention is to provide a multiple pump system wherein the pump outputs can be combined without causing abrupt flow and pressure changes as the pumps being flow together.

These and other important objects and advantages of the present invention are specifically set forth in or will become apparent from the following detailed description of preferred embodiments of the invention, when read in conjunction with the accompanying drawings, wherein:

FIG. 3 is a flow versus spool stroke metering curve of the present invention; and FIG. 4 is a schematic representation of a modified form of the invention utilized with a different load responsive valve.

DESCRIPTION OF THE PREFERRED EMBODIMENT

Figures 1, 2:
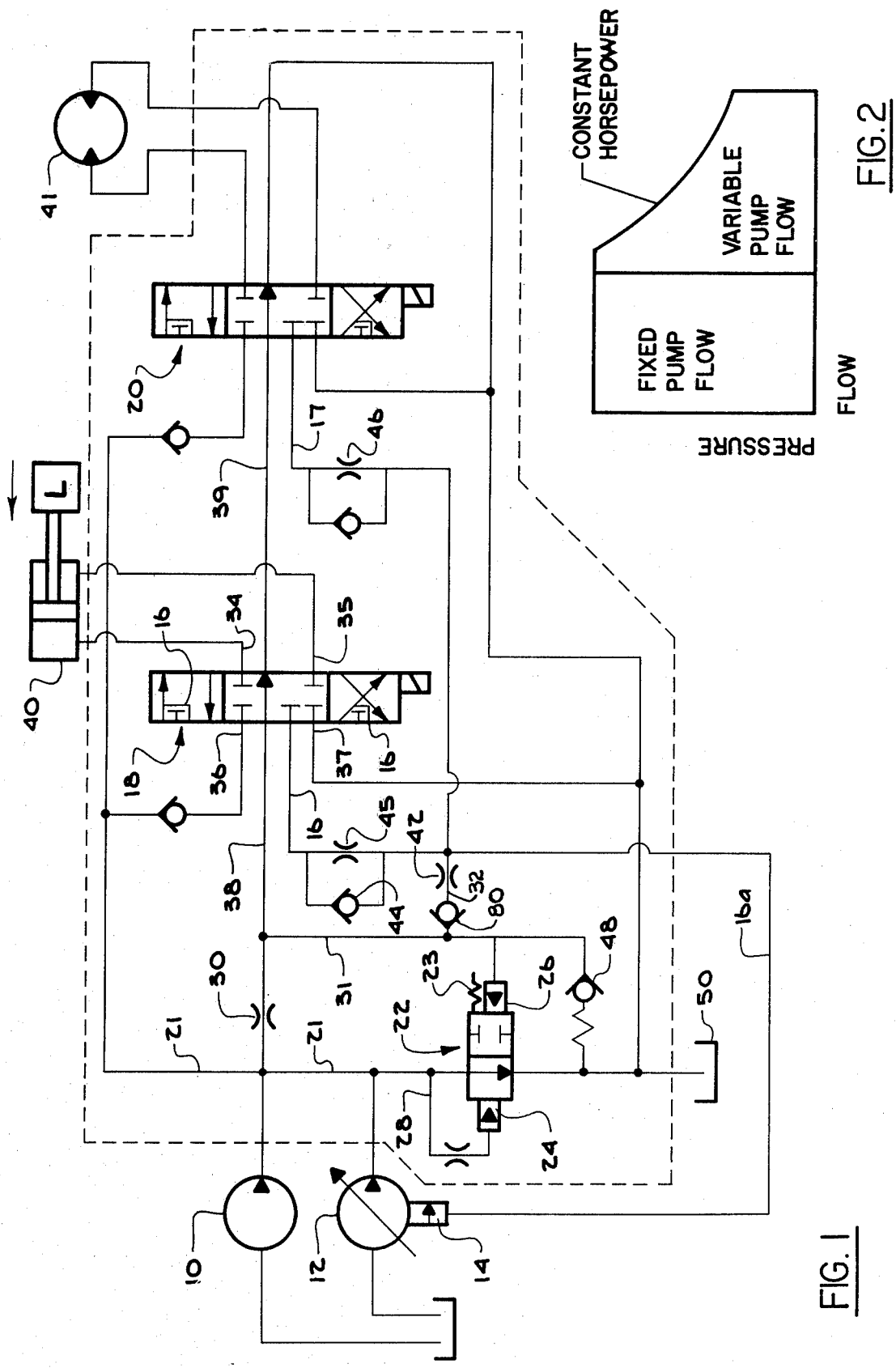
FIG. 1 is a schematic representation of the dual pump system of the present invention utilized with the load responsive valve described in U.S. Pat. 3,815,477.
FIG. 2 is a pressure flow curve of the present invention.

Turning now more particularly to FIG. 1, the dual pump system of the present invention includes a fixed displacement pump 10 connected in parallel with a variable displacement flow compensated pump 12. Pump 12 is of the axial piston type, well known in the art, and includes a pump compensator 14 which is flow responsive to the inlet-to-motor-port flow across valve 18. The two pumps 10 and 12 supply directional control valves 18 and 20 through pump inlet line 21. Control valves 18 and 20 are of the load responsive type and are included in a stack type arrangement which could include more of less valve sections depending upon the requirements of the system.

Also included in the control valve stack on the inlet side, is a separate unloading spool 22 which is biased by spring 23 towards a closed position. Located at opposite ends of unloading spool 22 are oppositely-acting servo chambers 24 and 26 which exert forces on spool 22 in conjunction with spring 23. Servo chamber 24 senses the pump inlet pressure through sensing line 28, while servo chamber 26 senses either the pressure drop across fixed orifice 30 through sensing line 31, or the pressure drop across control valve 18 via sensing line 32 and signal line 16. Unloading spool 22 senses the total volume of flow required by one or more of the motors 40 and 41, and allows this volume to flow to the control valves while diverting the remainder to reservoir 50.

In FIG. 1, control valve 18 is shown in its neutral position with motor ports 34 and 35 blocked, and pump inlet and reservoir ports 36 and 37 respectively, blocked, signal line 16 blocked, and neutral logic passage 39 open to reservoir, as long as the other valve sections in the stack are also neutrally positioned. Control valve 18 also has a straight-through operative position wherein signal line 16 senses the load pressure in motor port 34 downstream from the control valve spool.

In the control valve's other operative position, signal line 16 senses the load at motor port 35 downstream from control valve 18. Control valve 20 is identical to control valve 18 and is merely shown to illustrate that the invention works equally well with a stack of valves each controlling different functions such as cylinder 40 and motor 41.

Check valve 80 prevents reverse flow from the motor through the pilot passage 32 and across relief valve 48 when the latter is open, and thereby minimizes the volume of fluid required to flow through the relief valve as well as preventing undesirable motor movement when the relief valve opens.

Located in sensing line 32 is an additional fixed orifice 42 which is sized smaller than fixed orifice 30. Check valve 44 and orifice 45 substantially prevent cross flow between motor passages of different control valves, through the signal line 16 when more than one control valve member is in operating position. Only very slight cross flow passes orifices 45 or 46. Yet relatively free flow in the opposite direction across check 44 assures that servo chamber 26 will be maintained at the highest pressure existing at any of the motors being actuated.

The series arrangement of the neutral logic passages 38 and 39 of both valves allows servo chamber 26 to sense the neutral positioning of all the control valve spool members in the stack, while the parallel arrangement of signal lines 16 and 17 of each valve 18 and 20 transmits the highest motor port pressure, assuming two or more valves are being operated at the same time to the servo chamber 26. High pressure relief valve 48 communicates with servo chamber 26 and relieves to reservoir 50.

Variable volume pumps may employ many different types of controls such as flow compensators, torque or horsepower limiters, sharp cut-off pressure compensators or long range pressure compensators. The pump compensator 14 illustrated in FIG. 1, is a flow compensator type which senses pump outlet pressure and the pressure downstream of the spool in control valve 18. The control valve spool of valve 18 is a variable orifice and compensator 14 will change the stroke of pump 12 such that the pressure drop across the variable orifice of control valve 18 will remain constant. This constant pressure drop, which is also referred to as $\Delta p$, is set at a level higher than the $\Delta p$ of unloading spool 22.

OPERATION OF FIG. 1

With both control valves 18 and 20 in the neutral position, variable displacement pump 12 is at maximum stroke with combined flows of 52 GPM (see FIG. 3) being dumped across unloading valve 22 to reservoir. Unloading spool 22 is in the open position, as illustrated in the drawing, since initial pump start-up pressure is felt in servo chamber 24 via sensing line 28 which quickly overcomes spring 23 and moves the unloading spool to the right to its full open position. The pressure felt in servo chamber 26 is basically zero since neutral logic passage 38 is open to reservoir and the pressure drop across fixed orifice 30 is sufficient to overcome spring 23. Since the resistance of spring 23 is quite light, unloading spool 22 holds a very light pressure on the combined pump flow flowing to reservoir, which for example will be 40 PSI. Pump 12 is at full stroke since its compensator 14 is set at a $\Delta p$ higher than the 40 PSI $\Delta p$ of unloading spool 22. For purposes of example, the $\Delta p$ of pump compensator 14 would be 150 PSI and the $\Delta p$ of control valve 18 would be set at 200 PSI or any other figure which is greater than the pump $\Delta p$.

As the control valve spool of valve 18 is initially moved towards an operative position, the work load pressure is sensed in signal line 16 while neutral logic passage 38 is blocked. With the load pressure being felt in servo chamber 26, unloading spool 22 closes down causing both pumps to come up to load pressure plus the compensator setting or $\Delta p$ of the control valve. Since the $\Delta p$ of the control valve is higher than the $\Delta p$ of the pump compensator 14, pump compensator 14 immediately strokes pump 12 to zero displacement, as shown at point A in FIG. 3. Since the $\Delta p$ of the control valve, which is 200 PSI in our example, is greater than the 150 PSI $\Delta p$ of the pump compensator; the unloading spool will control while the pump compensator destrokes to zero awaiting the flow from pump 10 to be fully utilized. As the spool of control valve 18 is moved further, work port flow begins at point B on the metering curve of FIG. 3, while at the same time the bypass flow from pump 10 begins to diminish at point C on the metering curve. As the valve spool is opened further increasing the flow rate into motor port 34, the unloading spool further shuts down the bypass flow since it is attempting to hold a constant pressure drop across the control valve spool. The pilot control flow is across fixed orifice 30 through sensing line 31 and then across fixed orifice 42 to the downstream side of valve 18 through signal line 16. Orifice 42 is sized smaller than orifice 30 so that there is an accumulated pressure drop of 200 PSI across both orifices 30 and 42 which is the $\Delta p$ of control valve 18. As the spool of control valve 18 is opened further, the pressure drop across the valve spool decreases, and since the same pressure drop is felt across fixed orifices 30 and 42, the flow across said fixed orifices is likewise diminished. This diminished flow across orifice 30 thereby increases the relative pressure in servo chamber 26 of unloading spool 22, causing the unloading spool to move leftwardly, further shutting down the bypass flow which in turn increases the flow to the motor 40 in line 21 until the $\Delta p$ across control valve 18 is returned to its 200 PSI level.

At point D on the FIG. 3 metering curve, the full flow from pump 10 is flowing to work port 34, and the $\Delta p$ across control valve 18 has dropped to 150 PSI causing the pump compensator 14 of variable displacement pump 12 to begin to stroke-out increasing its flow in attempting to maintain a 150 PSI $\Delta p$ across the spool of control valve 18. As illustrated in the metering curve, further spool movement causes pump 12 to stroke-out to its maximum displacement.

FIG. 4

The system shown in this figure is utilized with a different type of load responsive valve than that shown in FIG. 1. The system includes a fixed displacement pump 10A connected in parallel with a variable displacement flow compensated pump 12A which is of the axial piston type. The displacement level of the pump 12A is controlled by a pump compensator 14A which basically senses the pressure drop across an orifice and accordingly positions the pump displacement so as to maintain a constant pressure drop across that orifice. The variable orifice which compensator 14A senses is the spool in control valve 52, and it senses said pressure drop through connecting sensing passages 56, 58 and 60.

The two pumps 10A and 12A supply directional control valves 52 and 54 through pump inlet line 62. Control valves 52 and 54 are of the load responsive type and can be included in a stack type arrangement which could include more or less valve sections depending upon the requirements of the particular system.

Also included in the control valve stack on the inlet side is a separate unloading spool 22A which is biased by spring 23A and servo chamber 26A towards a closed position while servo chamber 24A urges the spool towards an open position. The unloading spool 22A senses the total volume of flow required by one or more motors and allows this volume to flow to the control valve while diverting the remainder of the pump flow to reservoir 50. Servo chamber 24A senses the pump inlet pressure through sensing line 28A.

In the FIG. 4 position, control valve 52 is shown in its neutral position with the pump inlet and both motor ports blocked while sensing passages 60 and 61 are connected to reservoir 50 through drain line 64. With control valve 52 in its neutral position, servo chamber 26A is drained, therefore pump inlet pressure in servo chamber 24A is acting only against spring 23A causing the unloading spool 22A to unload the entire pump flow at a low pressure level, as for example 100 PSI. When control valve 52 is moved to its straight-through operative position, a sensing passage 60 senses the pump inlet pressure downstream from the spool while sensing passage 61 senses the return pressure from motor 40A. Shuttle valve 66 senses the higher pressure in either sensing passage 60 or 61, and moves accordingly so as to open a flow path between sensing passage 58 and the higher pressured sensing passage. If both control valves 52 and 54 are in operative positions at the same time, shuttle valve 68 will allow the unloading spool 22A to sense the higher load pressure being belt by the two valves 52 and 54. Check valves 70 and 72 are conventional load checks, while fixed restriction 74 is utilized merely for dampening. High pressure relief valve 76 relieves the pilot pressure in servo chamber 26A causing the unloading spool 22A to dump so as to not damage the system.

With control valve 52 neutrally positioned, variable displacement pump 12A will be stroked back to zero flow since the $\Delta p$ of pump compensator 14A is set at a lower level than the 100 PSI $\Delta p$ of unloading spool 22A, which lower level, for purposes of example will be 75 PSI. As control valve 52 is moved towards its straight-through position, before pump flow is open to the work port, the load is sensed in passage 60 flowing back to servo chamber 26A, causing shuttle spool 22A to bring the pump discharge pressure up to the load plus 100 PSI, the $\Delta p$ of spool 22A. If the load on the return side of the motor is greater, shuttle spool 66 will shift, allowing that pressure to control shuttle spool 22A. As the spool of control valve 52 opens pump inlet flow to the motor, spool 22A will adjust as the flow level to the motor increases, since spool 22A will attempt to keep a constant $\Delta p$ across the spool. As the valve spool moves further, increasing the flow to motor 40A, unloading spool 22A gradually closes off the bypass flow to reservoir 50 until it is completely closed. Any further increases of the flow to the motor 40A will cause the $\Delta p$ across valve 52 to drop. When the $\Delta p$ on control valve 52 drops to the level of pump compensator 14A, which is 75 PSI for our present example; compensator 14A will begin to stroke-out in attempting to maintain a constant 75 PSI drop across control valve 52. The system now functions as a variable displacement system, as illustrated by the FIG. 2 curve, which can employ varying types of controls such as flow compensators, torque and horsepower limiters, as well as pressure compensators.

Control valve 54 with its accompanying shuttle valve 78 operates in an identical manner to valve 52, previously described, and when both valves are operating simultaneously, that valve experiencing the higher load will control the unloading spool 22A and pump compensator 14A.

The detailed description of preferred embodiments set forth above is exemplary in nature and is not to be considered as limiting to the scope and spirit of the invention as set forth in the accompanying claims.

Having described the invention with sufficient clarity that those skilled in the art may make and use it, what is claimed as new and desired to be secured by Letters Patent is:

1. An open-center load sensing system supplied by multiple pumps for driving at least one motor (40) which in turn drives a load comprising:
   a fixed displacement pump (10);
   a variable displacement flow compensated pump (12) connected in parallel with the fixed displacement pump including a flow responsive compensator means (14) with a predetermined $\Delta p$ for controlling the displacement of the pump;
   a load responsive control valve means (18) including a control valve spool positioned between said pumps and said motor which senses the load on said motor in its operative positions, the control valve means includes an unloading spool means (22) which is flow responsive in the operative positions of the valve and maintains a constant $\Delta p$ across said control valve spool by dumping pump flow to reservoir (50); said control valve $\Delta p$ being greater than the $\Delta p$ of said pump compensator means (14); the unloading spool means (22) is capable of dumping to reservoir a portion of or the entire flow from said pumps;
   a first sensing passage (16, 32 and 31) connecting the load caused pressure on said motor downstream of said control valve means to the unloading spool; and
   a second sensing passage (16a) connecting the pump compensator means with said load.

2. A system as set forth in claim 1, wherein the unloading spool means (22) includes servo chambers (26 and 24) at opposite ends of the spool means which sense a pressure drop across said control valve means (18), and a spring means (23) urging the unloading spool means toward a closed position in conjunction with one of said servo chambers.

3. A system as set forth in claim 1, wherein the unloading spool means (22) includes oppositely-acting first and second servo chambers (26 and 24) at opposite ends of the spool means which sense a pressure drop across said control valve means (18), and a spring means (23) urging the unloading spool toward a closed position in conjunction with the first servo chamber (26), and the first sensing passage is connected to the first servo chamber of the unloading spool means.

4. A system as set forth in claim 1, wherein the unloading spool means (22) includes oppositely-acting first and second servo chambers (26 and 24) at opposite ends of the spool means which sense a pressure drop across said control valve means (18), and a spring means (23)

urging the unloading spool toward a closed position in conjunction with the first servo chamber, and the first sensing passage is connected to the first servo chamber of the unloading spool means, and said control valve means (18) having a neutral position which drains the first servo chamber of the unloading spool means.

5. An open-center load sensing system supplied by multiple pumps for driving at least one motor (40) which in turn drives a load comprising:
- a fixed displacement pump (10);
- a variable displacement flow compensated pump (12) connected in parallel with the fixed displacement pump including a flow responsive compensator means (14) with a predetermined $\Delta p$ for controlling the displacement of the pump;
- a load responsive control valve means (18) including a control valve spool positioned between said pumps and said motor which senses the load on said motor in its operative positions, the control valve means includes an unloading spool means (22) which is flow responsive to neutral drain flow across a first fixed orifice (30) with a $\Delta p$ less than the $\Delta p$ of the pump compensator, the unloading spool means includes servo chambers (26 and 24) at opposite ends sensing the pressure drop across said first fixed orifice to position said unloading spool means, the unloading spool means is capable of dumping to reservoir a portion of or the entire flow from the fixed and variable displacement pumps;
- a first sensing passage (16, 32 and 31) including a second fixed orifice (42) therein connecting the load on said motor downstream from said control valve means to one of the unloading spool servo chambers sensing downstream pressure, the second orifice being sized such that the $\Delta p$ from the pump discharge to load is greater than the $\Delta p$ of the pump compensator; and
- a second sensing passage (16a) connecting the pump compensator means to the load.

6. A system as set forth in claim 5, wherein the servo chambers (26 and 24) are oppositely-acting first and second chambers including a spring means (23) urging the unloading spool toward a closed position in conjunction with the first servo chamber and the first sensing passage is connected to the first servo chamber of the unloading spool means.

7. A system as set forth in claim 5, wherein the servo chambers (26 and 24) are oppositely-acting first and second chambers including a spring means (23) urging the unloading spool toward a closed position in conjunction with the first servo chamber, and the first sensing passage is connected to the first servo chamber of the unloading spool means, and a third sensing passage (38) connecting the first fixed orifice to the control valve spool, and said control valve means having a neutral position which drains the third sensing passage to reservoir, and operative positions which block the flow in the third sensing passage.

* * * * *